United States Patent

[11] 3,586,018

| [72] | Inventors | Sven-Eric Bogardh;<br>Sven V. Nordquist, both of Angelholm, Sweden |
|---|---|---|
| [21] | Appl. No. | 801,603 |
| [22] | Filed | Feb. 24, 1969 |
| [45] | Patented | June 22, 1971 |
| [73] | Assignee | Aktiebolaget Thermia-Verken<br>Arvika, Sweden |

[54] SELF-CLOSING VALVE
7 Claims, 5 Drawing Figs.

| [52] | U.S. Cl. | 137/67 |
| [51] | Int. Cl. | F16k 31/00 |
| [50] | Field of Search | 137/67; 222/54 |

[56] References Cited
UNITED STATES PATENTS

| 2,292,801 | 8/1942 | Slidell | 137/67 X |
| 2,347,203 | 4/1944 | Lindsay | 137/67 |
| 2,925,147 | 2/1960 | Minera | 137/67 X |

Primary Examiner—M. Cary Nelson
Assistant Examiner—Richard Gerard
Attorney—Cushman, Darby & Cushman ABSTRACT: A self-closing valve is disclosed wherein the valve body is temporarily prevented from closing by an obstacle that is slowly removed by the fluid flowing through the valve. Said obstacle may consist of a dissolvable plug that is placed in a chamber into which an extension of the valve body reaches so as to rest against said plug. Said chamber has an easily removable cap enabling convenient replacement of such plugs. The dissolvable substance may also consist of a powder filling in a perforated sleeve. The liquid flow past the dissolvable substance may be changed in order to vary the retardment of the closure of the valve.

INVENTORS
SVEN-ERIC BOGARDH
SVEN VILLY NORQUIST
BY
Cushman, Darby & Cushman
ATTORNEYS

SELF-CLOSING VALVE

The invention relates to a valve of the common type comprising a valve housing with inlet and outlet, and a valve body movable towards a valve seat. The object of the invention is to provide automatic closure of such a valve after the lapse of a certain time period which often may be quite long. Such valve operation may be desired for instance when sprinkling lawns; the sprinkler may then be left unattended and yet one is certain that no excessive amount of water is spread.

Another object of the invention is to provide dosage or quantity control, whereby the valve admits during each of its opened periods a certain amount of liquid or gas that is maintained more or less accurately at a desired valve.

A further object of the invention may be to proportion an admixture to the fluid let through the valve.

One or more of said objects are realized by designing the valve in accordance with the main feature of the invention which consists therein that the valve housing has a chamber adapted to receive a filling consisting of a substance which is slowly removable by the action of a fluid flow through the valve, e.g. by being dissolved, eroded, flushed out or treated in a similar manner, and in that the valve body is mounted for being supported by said filling and for being released for motion in the closing direction when said filling is wholly or partly removed.

Figure 1:
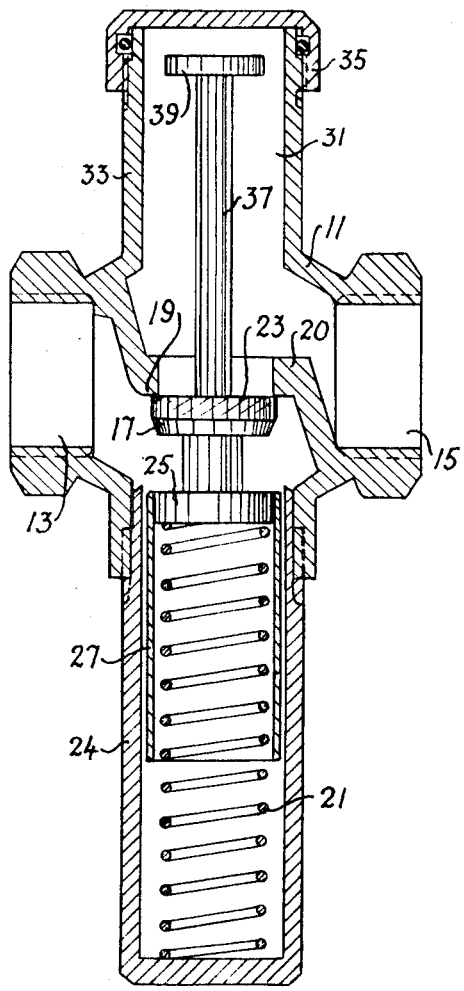
Figure 2:
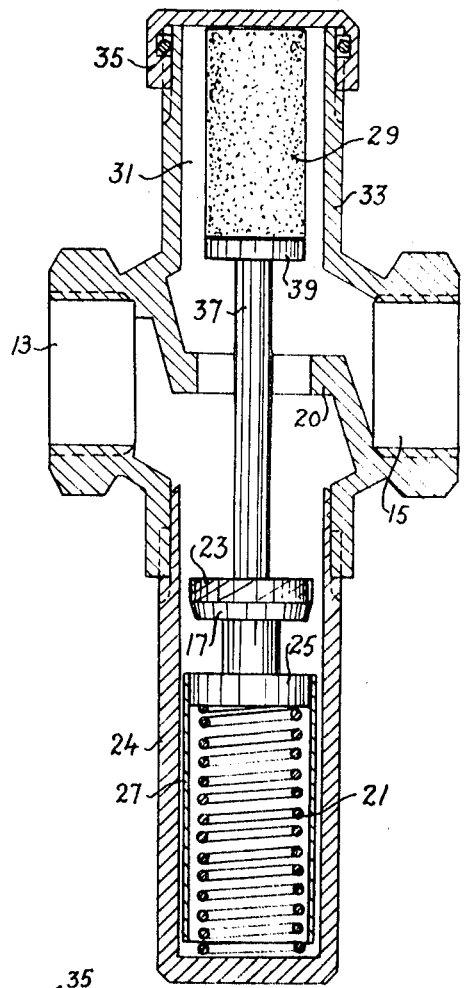
Figure 3:
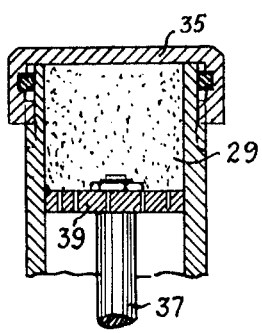
Figure 4:
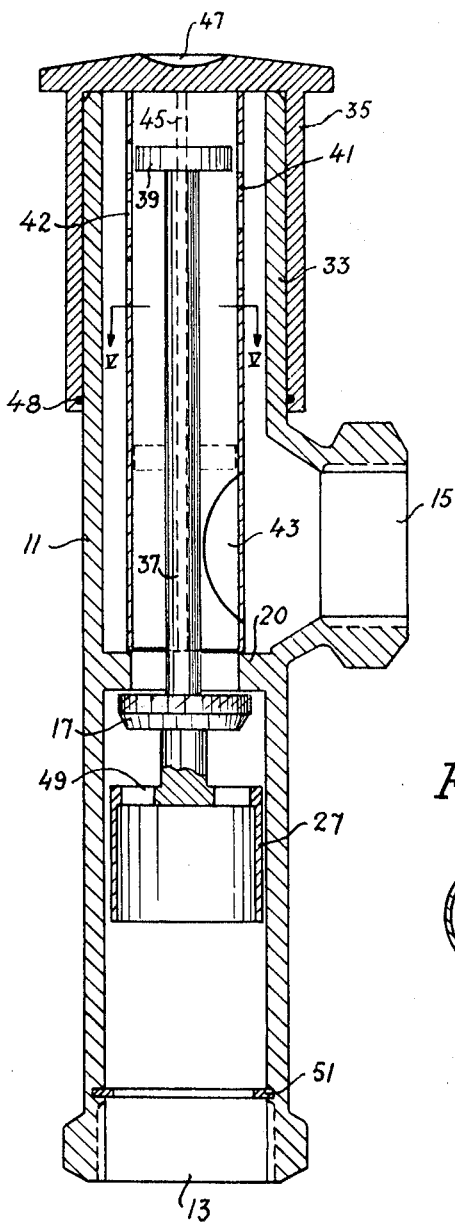
Figure 5:
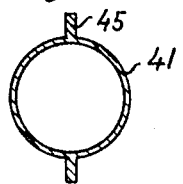

Further objects, advantages and features of the invention will be apparent from the following description, wherein reference is made to the accompanying drawings, in which preferred embodiments of the invention are shown merely as examples. FIGS. 1 and 2 are longitudinal sectional views of a first embodiment of the valve shown in closed and fully opened position, respectively. FIG. 3 shows a modification of a detail of said valve. FIG. 4 is a longitudinal sectional view of a second embodiment, and FIG. 5 is a cross-sectional view of a detail thereof, taken from the line V-V in FIG. 4.

The valve shown in FIGS. 1 and 2 comprises a valve housing 11 with inlet 13 and outlet 15. The communication therebetween can be closed and opened by means of a valve body 17 which is displaceable towards and from a valve seat 19 formed around a circular aperture in a partition wall 20 in the valve housing. The valve body is subjected to the influence of a coiled spring 21 which strives to close the valve by pressing a sealing washer 23 upon the valve body into sealing contact with the seat 19. Said spring is resiliently compressed between the bottom of a spring housing 24 and the head 25 of the valve body. A sleeve 27 attached to said head enclosed part of the spring and guides the valve body in a rectilinear path. By abutting against the spring housing bottom said sleeve determines the maximum compression of the spring and the extreme opened position of the valve body.

According to the invention of the valve body can be checked by means of an obstacle counteracting the spring force and maintaining the valve temporarily opened. In order automatically to nullify said check after a certain desired length of time, said check is formed by an obstacle consisting of a substance that can be slowly removed by the action of the liquid, usually water, or the gas flowing through the valve, for instance due to the physical or chemical dissolution of the substance, or its erosion, collapsing, flushing out etc. In its opened position the valve is propped up against said substance which may be a solid body or a loose or consolidated powder, and consequently the valve body can be displaced into the closed position only when said propping support has yielded due to the removal of said substance.

In the embodiment shown in FIGS. 1 and 2 the obstacle is shaped as a solid, longish, cylindrical body, e.g. a plug, cartridge or tablet 29. Said body is enclosed in a chamber 31 provided therefor, which is in permanently open communication with the valve outlet 15 and which is so located that at least part of the main flow admitted by the valve is directed into the same. The chamber is bordered by the cylindrical wall of a tubular extension 33 of the valve housing, and by an end closure thereof. Said closure is removable in order to allow easy replacement of the filling body 29, when required, and it may consist of a threaded stopper, a lid or, as shown in FIGS. 1 and 2, of a threaded cap 35 engaging the outer cylindrical face of the extension 33 and sealed thereto by a rubber ring. Said chamber 31 is situated on the side of the partition wall 20 opposite to the spring housing 24 and the valve body 25 and is coaxial thereto. A rod-shaped extension of the valve body or stem 37 which extends centrally through the seat aperture and ends with a flat head or disc 39, projects into said chamber. When a plug 29 is inserted into the chamber provided therefore and abuts against the disc 39, the entire valve body is displaced from the position of FIG. 1 into the position of FIG. 2. In said and intermediate positions the disc 39 is circumferentially enclosed by the cylindrical wall of the filling chamber, said disc thus forming a piston or displaceable bottom in said chamber. However, the disc is of a somewhat smaller diameter than the filling chamber, so that an annular gap is formed which the flowing fluid can pass in order to reach the filling body, the latter preferably being so narrow that the fluid has access to its cylindrical face. Accordingly as the filling body is loosened up or dissolved and carried away by the liquid flow, it yields to the spring pressure and the valve body is displaced in the closing direction until the position of FIG. 1 is reached in which the filling is completely removed and the valve closed. The course may then be repeated by inserting another filling body.

In the modification shown in FIG. 3, the abutting disc 39 is of approximately the same diameter as the filling chamber; instead it is pervious in order to make the filling accessible to the fluid. In this case the filling need not have mechanical rigidity but may be a powder or possibly a viscous liquid.

The embodiment shown in FIGS. 4 and 5 corresponds in essential parts to the one above described, and therefore the same reference numerals have been used for like members throughout this description. An important deviation, however, consists wherein that the walls of the filling chamber are pervious involving a more regular and uniform dissolution of the filling substance and a freer choice of said substance. As shown in FIG. 4, the filling chamber is formed by a cylindrical sleeve 41 of a smaller diameter than the tubular extension 33 and concentric thereto, so that along the entire length of the sleeve there is formed an interspace into which the liquid can penetrate in order to attack the filling from the sides, viz through the perforation apertures 42 in the sleeve.

The object of controlling the proportion of dissolved filling substance added to the liquid flow is realized in the valve of FIG. 4 by the provision of means for varying the magnitude and/or the path of the flow directed into the filling chamber, thus making the dissolving action of the flow more or less effective. Simultaneously the retardation of the closing of the valve is also controlled. Said control means is formed by the sleeve 41 which is united with the cap 35 and therefore turnable from the outside by manual operation of the cap. The sleeve extends to the vicinity of the partition wall 20, so that the entire or at least a major portion of the liquid admitted by the valve will flow into the open end of the sleeve. The sleeve is provided with an eccentric wide aperture 43 through which the liquid flows out of the sleeve. Said aperture is situated opposite to the valve outlet 15, and in the shown angular position of the sleeve the flow is directed straight into said outlet, no or a very slight liquid motion taking place around the perforated outer end of the sleeve. If the sleeve is turned through an angle of 180°, the liquid will instead be forced to flush around the sleeve with maximum intensity; intermediate angular positions cause a more or less efficient flushing of the sleeve. In order to direct the flow axially of the sleeve 41, the same may be provided with longitudinal guiding ribs 45 (see also FIG. 5).

The cap 35 which is turnable without restriction, is held by a spring clamp (not shown) which exerts a pressure upon the recess 47 in the center of the end face of the cap. As an alternative, the cap may be retained by a bayonet clutch which also allows the sleeve to be turned through a considerable angle.

The cap is sealed to the tubular extension 33 by means of a rubber ring 48. When the cap with refilled sleeve 41 is pushed upon said valve housing extension 33, the ring 48 seals off the filling chamber before the filling body abuts against disc 39 and opens the valve. However, a condition therefor is that the cylindrical part of the cap is made at least as long as the filling body.

Preferably the cap has an engraved arrow or other sign indicating the direction of the aperture 43 and whether the valve is adjusted for a long or a short retardation time period.

The valve of the invention is useful for many different kinds of dosage, e.g. for the supply of fertilizers in connection with watering, for clorination of bathing water or for admixture of medical preparations to water for shower-baths.

In the embodiment of FIG. 4 the valve inlet 13 is situated in line with the valve body. The liquid runs through apertures 49 in the head of the valve body, and due to the pressure drop in said apertures the valve body is influenced by a force great enough to make a similar spring as the spring 21 in FIG. 1 superfluous. It may also be that the pressure differential due to the restriction of the flow at the valve seat is sufficient to operate the valve body in the closing direction. An annulus 51 inserted in the inlet 13 cooperates with the end of the sleeve 27 to limit the displacement of the valve body and to retain the same within the valve housing.

The above-described embodiments of the valve are merely examples which do not restrict the scope of the invention as set forth in the following claims. Modifications of said embodiments in various respects are possible. One modification may consist in placing the filling chamber in steady communication with the inlet end portion of the valve housing.

We claim:

1. A valve with delayed automatic closure comprising a valve housing having first and second chambers, said first chamber having an inlet for a fluid, said second chamber having an outlet for said fluid and a tubular extension closed by a removable cap, said first and second chambers being separated from each other by a wall having an aperture which forms a valve seat, a valve body being situated in said first chamber, said valve body being mounted on an extension which projects through said aperture and into said second chamber and having an enlarged section on the end of the extension in said second chamber, apertured sleeve means cooperating with said enlarged section and defining therewith an apertured cylindrical chamber situated within said second chamber and on the opposite side of said enlarged section from said valve seat aperture for retaining material dissolvable in said fluid, said apertured sleeve means being attached to said removable cap, said extension with enlarged end and valve body being movable in a coaxial direction with respect to the axis of said apertured cylindrical chamber whereby the extension with enlarged end and valve body is supported by the dissolvable material in said apertured cylindrical chamber and as the dissolvable material disintegrates, the extension with enlarged end and valve body moves in said axial direction such that the valve body ultimately seats on said valve seat.

2. A valve as claimed in claim 1 wherein the enlarged end on said extension is perforated.

3. A valve as claimed in claim 1 wherein the enlarged end on said extension is of a smaller diameter than the inner diameter of said apertured sleeve means.

4. A valve as claimed in claim 1 wherein the apertured sleeve means and removable cap are rotatable by manual operation, the opposite end of said sleeve means with respect to said removable cap being situated close to the valve seat aperture and the apertures of said apertured sleeve means being so shaped to direct the flow of liquid through the second chamber differently depending upon the angular position of said cap and sleeve means.

5. A valve as claimed in claim 4 wherein the apertured sleeve means has a central inlet close to the valve seat aperture and an outlet.

6. A valve as claimed in claim 1 wherein the removable cap telescopes over said tubular extension.

7. A valve as claimed in claim 6 wherein the overlap of the telescoping members is the same length as the maximum movement of said extension.